UNITED STATES PATENT OFFICE.

JOHN A. RENNIE, OF NEW YORK, N. Y.

BRAZING COMPOUND.

No. 838,274. Specification of Letters Patent. Patented Dec. 11, 1906.

Application filed March 20, 1906. Serial No. 306,966.

*To all whom it may concern:*

Be it known that I, JOHN A. RENNIE, a citizen of the United States, residing at New York, in the county of New York and State of New York, have invented certain new and useful Improvements in Brazing Compounds, of which the following is a specification, such as will enable those skilled in the art to which it appertains to make and use the same.

This invention relates to a new and useful composition of matter to be used as a brazing compound, of which the following is a specification.

My composition consists of the following ingredients, combined in the proportions stated: Black oxid of manganese, powdered, two parts, by weight; red hematite ore, powdered, three parts, by weight; boracic acid, in dust form, known as "impalpable," two parts, by weight. These ingredients are to be thoroughly mingled by agitation, and sufficient clean water is added thereto to make a plastic paste.

In using the above-named composition the surfaces of the metals to be brazed together are covered with this compound and are heated in a proper furnace. A flux of boracic acid and spelter is then poured thereon, whereby a perfect joint is formed between the two metals desired to be united.

I am not aware that all the ingredients of my composition have heretofore been used together.

Having fully described my invention, what I claim as new, and desire to secure by Letters Patent, is—

1. A brazing compound consisting of oxid of manganese, red hematite ore and boracic acid combined in suitable proportions, substantially as described.

2. The herein-described composition of matter consisting of two parts by weight of oxid of manganese, three parts by weight of red hematite ore and two parts by weight of boracic acid in dust form, substantially as described.

3. The herein-described composition of matter consisting of two parts by weight of oxid of manganese, three parts by weight of red hematite ore and two parts by weight of impalpable boracic acid, substantially as described.

In testimony that I claim the foregoing as my invention I have signed my name, in presence of the subscribing witnesses, this 19th day of March, 1906.

JOHN A. RENNIE.

Witnesses:
F. A. STEWART,
C. E. MULREANY.